UNITED STATES PATENT OFFICE.

ALLAN A. FREEMAN, OF NEW YORK, N. Y.

TESTING AND INDICATING PAPER AND PROCESS OF MAKING THE SAME.

1,216,303. Specification of Letters Patent. Patented Feb. 20, 1917.

No Drawing. Application filed December 9, 1915. Serial No. 66,024.

*To all whom it may concern:*

Be it known that I, ALLAN A. FREEMAN, a citizen of the United States, residing at New York, in the county of New York and State of New York, have invented certain new and useful Improvements in Testing and Indicating Paper and Processes of Making the Same; and I do hereby declare the following to be a full, clear, and exact description of the invention, such as will enable others skilled in the art to which it appertains to make and use the same.

My invention consists in the novel features hereinafter described and particularly pointed out in the claims, and relates to an improved testing and indicating paper, or material for indicating the presence of acid or alkali, and also the percentage of the same in the solution or material tested.

The material most commonly employed for indicating the presence of acid or alkali is the well known litmus paper. Litmus paper deteriorates very rapidly when exposed to air and must be kept hermetically sealed at all times in order to preserve it. It is usually supplied to the public in a form of narrow and exceedingly thin strips contained within a well stoppered bottle, and in the practical use of it a considerable amount is wasted in abstracting the sheets from the bottle and even with the greatest care deterioration will occur. The litmus paper further merely indicates the presence of acid or alkali, and in order to ascertain even approximately the percentage of either, recourse to a well equipped laboratory, and quantitive analysis of the solution, is necessary.

The litmus paper as is well known is furnished in two colors, blue litmus paper turning red when exposed to an acid solution, and red litmus paper turning blue when exposed to an alkali solution. Litmus paper can only be used once and is then thrown away.

The object of my invention is to provide a testing and indicating paper which is not affected in any way by atmospheric conditions, and which will not only indicate the presence of acid and alkali but can be used also to indicate the percentage of acid or alkali in the solution under examination and which further can be used over and over again. My improved testing and indicating paper can therefore be carried in the pocket or kept in an office or laboratory and freely exposed to the air, and will last indefinitely. When carried in the pocket it may be conveniently protected from contact with dust and foreign matter by inclosing it in any suitable manner.

My improved testing and indicating paper comprises a sheet, strip, or block of absorbent material such, for example, as a suitable bibulous paper impregnated by a dye stuff of the triphenylmethane group. The dye stuffs of this group have the property of discharging their color when treated with alkali and recovering the color when the alkali is neutralized. One of the dye stuffs of this group which I have advantageously used for the production of my improved testing and indicating paper is that known in the art as malachite green crystals. In the preparation of the paper the following process may be advantageously employed. The paper is first dyed in a solution of the triphenylmethane dye stuff, for example, malachite green crystals.

The paper is then treated with an alkali solution by means of which the color is entirely discharged leaving the paper white, after which it is dried and is ready for use. In some instances instead of first dyeing the paper and then discharging the color, I may treat the solution of the triphenylmethane dye stuff with a sufficient amount of alkali to discharge the color from the solution and then impregnate the paper with the colorless solution after which it is dried.

If this white paper prepared in either of the above ways is touched with a drop of solution containing an acid the alkali in the paper will be neutralized and the original color restored. Thus in the case of paper impregnated with malachite green crystals, from which the color has been discharged, when treated with an acid it will turn a vivid green which is the original color produced by the dye. After a piece of the paper has been used in the manner described as a test for acid, for example, it can be restored to its original condition by treating it with a sufficient quantity of any ordinary alkali solution to again discharge the color leaving it white and ready for further use.

As before stated it is possible with my improved paper to indicate the exact percentage of an acid in the solution tested.

Thus, for example, if a single drop of an acid containing solution is applied to a piece of my improved paper, the color will be instantly restored, thus showing the presence of acid. If now a solution of alkali of known strength, say for example, a one per cent. solution, is applied drop by drop to the paper until the color is entirely discharged therefrom by the neutralization of the acid from the test drop, the exact percentage of acid in the original drop, and therefore in the original solution, will be indicated.

The same piece of test paper can also be used as a test and indicator for both acids and alkalis. In testing for alkalis the paper may be simply impregnated with the triphenylmethane dye stuff in which case a drop of alkaline solution thereon would discharge the color and indicate the presence of an alkali. The same paper can be used to test for acid by first treating it or a portion of it with an alkali to discharge the color when another solution containing an acid will restore the color to the discharge portion. If the paper, as prepared, has been dyed with the triphenylmethane dye stuff and then treated with alkali to discharge the color and leave it white any acid solution will restore the color to the paper as heretofore described, and if it is used to test for an alkali it is only necessary to first restore the color by the use of an acid solution when the presence of an alkali solution will be indicated by again discharging the color. In testing either alkaline or acid solutions the percentage of either can be readily determined by using a solution of known strength in measured quantity, as drop by drop for example, to neutralize the known quantity of the solution under examination applied to the paper.

While I have used the term paper to indicate the innocuous absorbent body which is impregnated as hereinbefore set forth it is to be understood that I may use other innocuous absorbent material, although paper is ordinarily found most serviceable and convenient. I also prefer to use a white paper although obviously an innocuous absorbent material of any natural color not affected by acids or alkalis and contrasting with the color of the dye stuff employed would give the desired results.

My improved testing and indicating paper is not affected by the atmosphere and is a permanent testing and indicating material, and as herebefore set forth it can be used over and over again by neutralizing the effect of the acid or alkali material under examination, upon it and restoring it to its original condition.

What I claim and desire to secure by Letters Patent is:

1. As a new article of manufacture, a permanent testing and indicating material, unaffected by the atmosphere, comprising a dry absorbent innocuous body impregnated with a dye stuff of the triphenylmethane group.

2. As a new article of manufacture, a permanent testing and indicating material, unaffected by the atmosphere, comprising a dry absorbent innocuous body impregnated with a dye stuff of the triphenylmethane group, from which the color has been discharged.

3. As a new article of manufacture, a permanent testing and indicating paper comprising dry paper impregnated with a dye stuff composed of malachite green crystals.

4. As a new article of manufacture, a permanent testing and indicating paper comprising dry paper impregnated with a dye stuff composed of malachite green crystals, and a sufficient amount of alkali to discharge the color thereof.

5. The herein described process of making a permanent testing and indicating material which will be unaffected by the atmosphere, which consists in treating a solution of a dye stuff of the triphenylmethane group with an alkali in sufficient quantity to discharge the color therefrom impregnating dry innocuous absorbent material with the colorless material and drying the absorbent material.

6. The herein described process of making a permanent testing and indicating material, which is not affected by the atmosphere, which consists in impregnating a dry innocuous material with a solution of a dye stuff of the triphenylmethane group from which the color has been discharged.

7. The herein described process of making a permanent testing and indicating material which consists in treating the paper with a solution of malachite green crystals and an alkali in sufficient quantity to discharge the color thereof and drying the absorbent material.

In testimony whereof I affix my signature.

ALLAN A. FREEMAN.

Copies of this patent may be obtained for five cents each, by addressing the "Commissioner of Patents, Washington, D. C."